United States Patent [19]

Tanton

[11] 4,011,014
[45] Mar. 8, 1977

[54] POLARIZATION ROTATION ANALYZER

[75] Inventor: George A. Tanton, Huntsville, Ala.

[73] Assignee: The United States of America as represented by the Secretary of the Army, Washington, D.C.

[22] Filed: Mar. 8, 1974

[21] Appl. No.: 449,407

[52] U.S. Cl. .............................. 356/116; 356/119
[51] Int. Cl.² ...................................... G01J 4/04
[58] Field of Search ........... 350/151; 356/114, 116, 356/117, 119

[56] References Cited
UNITED STATES PATENTS 3,481,671 12/1969 West et al. .................. 356/116
3,761,724 9/1973 Dennis .......................... 356/205

OTHER PUBLICATIONS

Applied Optics, p. 668, vol. 6, No. 4, Apr. 1967.
Pidgeon et al., "Infra-Red Faraday Rotation in Semiconductors," Infra-Red Physics, vol. 4, No. 1, Mar. 1974, article begins p. 13, cited pp. 17-21.

Primary Examiner—John K. Corbin
Assistant Examiner—Richard A. Rosenberger
Attorney, Agent, or Firm—Nathan Edelberg; Robert P. Gibson; William P. Murphy

[57] ABSTRACT

A machine for testing polarization rotation by translucent specimens includes a standard spectrophotometer disposed for establishing and converging a pair of light beams from a single monochromatic source and provided with a recorder. A polarizer, a station for mounting a translucent specimen and an analyzer are serially provided for passage therethrough of one of the beams and a magnetic device is provided for reversible mounting astride the station. The polarizer and analyzer are respectively disposed for orientation to a reference plane of the one beam and for modification of the intensity thereof in a plane displaced at a predetermined angle to the reference plane. The magnetic device displaces the specimen polarization plane at equal and opposite angles to the reference plane and the recorder provides outputs in logarithmic proportion to the intensity ratios of the beams.

3 Claims, 4 Drawing Figures

POLARIZATION ROTATION ANALYZER

BACKGROUND OF THE INVENTION

Faraday rotation is a method of measuring rotation of polarized light beams by translucent specimens that has many diagnostic applications including determination of constituent concentrations in the specimens and determination of the structure of the constituents.

Conventional methods of measuring Faraday rotation require separation of the specimen rotation from a large inherent background of scattering and absorption of the light beam by the specimen. The separation is frequently accomplished by use of superconducting magnets that require liquid helium cooling to produce a high rotation within the specimen and a rotating analyzer for measurement of the polarization planar rotation.

SUMMARY OF THE INVENTION

Structure and performance of the instant polarization rotation analyzer are markedly different from the prior art since the structure includes a polarizer and a static analyzer installed in the specimen compartment of a standard spectrometer to permit a low field magnetic device to be employed for measurement of specimens having inherent optical rotary power or Faraday rotation of specimens without such power.

DESCRIPTION OF THE PREFERRED EMBODIMENT

Figure 1:
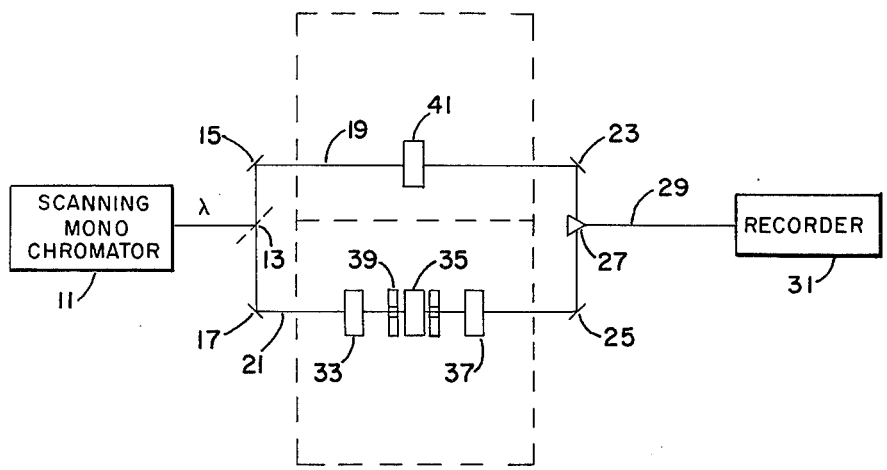
FIG. 1 is a schematic view of the analyzer.

A standard absorption spectrophotometer such as Cary Model 14 is employed in which light from a selective frequency monochromator 11 is directed by a chopper 13 and mirrors 15 and 17 to establish a pair of beams 19 and 21 and mirrors 23, 25 and 27 converge the beams to chopped beam 29 for direction to recorder 31. Rotation of the plane of light polarization can be measured to an accuracy of 0.005° with the Cary Model 14.

Beam 21 is successively passed through a polarizer 33, a translucent specimen 35 and an analyzer 37. Polarizer 33 and analyzer 37 are respectively disposed to orient beam 21 to a reference plane and to modify the intensity of beam 21 in a plane displaced at predetermined angle $\theta$ to the reference plane.

Figure 2:
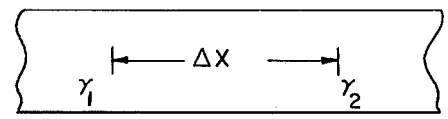
FIG. 2 is a typical strip chart of the recorder.

Recorder 31 includes a detector (not shown) and the signals therefrom are amplified to drive a strip chart as shown in FIG. 2 with outputs $\gamma_1$ and $\gamma_2$ on a scale of 0.01 absorbence units per inch proportional to the logarithms of intensity ratios of beam 21 to beam 19 in accordance with Beers - Lambert Law as respectively identified as I and I' in the equation below. $I_o$ is identified in the Beers - Lambert Law as the intensity of the beam impinging on the specimen.

$$\text{Intensity ratio } \gamma = \log \frac{I'}{I} = \log \left( \frac{I'}{10^{-R} I_0 \cos^2 (\Theta \pm \delta)} \right).$$

where R is the sum of reflections and absorption of intensity by the specimen and $\delta$ is the angle of inherent rotation of the specimen.

Figure 4:
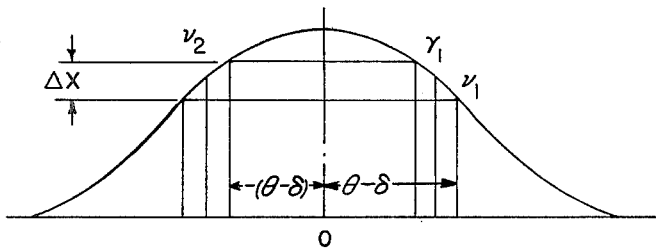
FIG. 4 is a graph of intensity versus displacement of the analyzer.

For specimens having an inherent capability of rotating the plane of polarization (rotary power) recorder outputs $\gamma_1$ and $\gamma Y_2$ are plotted as in FIG. 4 with and without the specimen and with analyzer 37 rotated through $\pm \theta$ the difference in the outputs $\Delta X$ is:

$$\Delta X = \gamma_1 - \gamma_2 = \log \left[ \frac{I'}{I_+} \div \frac{I'}{I_-} \right] \text{ where } I_+ = 10^{-R} I_0 \cos^2(\Theta + \delta) \text{ and } I_- = 10^{-R} I_0 \cos^2(\Theta - \delta)$$

$$\Delta X = \log \left[ \frac{\cos^2 (\delta - \Theta)}{\cos^2 (\delta + \Theta)} \right] = 2 \log \frac{\cos (\delta - \Theta)}{\cos (\delta + \Theta)}$$

changing to base e $$\Delta X = \frac{2}{2.3} \ln_e \left[ \frac{\cos (\delta - \Theta)}{\cos (\delta + \Theta)} \right] = \frac{1}{1.15} \ln_e \left[ \frac{\cos (\delta - \Theta)}{\cos (\delta + \Theta)} \right]$$

$$e^{1.15 \Delta X} = e^{\ln_e \left[ \frac{\cos (\delta - \Theta)}{\cos (\delta + \Theta)} \right]} = \frac{\cos (\delta - \Theta)}{\cos (\delta + \Theta)}$$

$$e^{\ln_e X} = X$$

$$e^{1.15 \Delta X} = \frac{\cos (\delta - \Theta)}{\cos (\delta + \Theta)} = \frac{\cos \delta \cos \Theta + \sin \delta \sin \Theta}{\cos \delta \cos \Theta - \sin \delta \sin \Theta}$$

For $\delta < 1°$; $\cos \delta = 1$ and $\sin \delta = \delta$ radians $$e^{1.15 \Delta X} = \frac{\cos (\delta - \Theta)}{\cos (\delta + \Theta)} = \frac{\cos \Theta (1) + \delta \sin \Theta}{\cos \Theta (1) - \delta \sin \Theta}$$

$$e^{1.15 \Delta X} = \frac{\frac{\cos \Theta}{\cos \Theta} + \frac{\delta \sin \Theta}{\cos \Theta}}{\frac{\cos \Theta}{\cos \Theta} - \frac{\delta \sin \Theta}{\cos \Theta}}$$

$$e^{1.15 \Delta X} = \frac{1 + \delta \tan \Theta}{1 - \delta \tan \Theta} \text{ Multiply by } 1 - \delta \tan \Theta$$

$$e^{1.15 \, X} (1 - \delta \tan \theta) = 1 + \delta \tan \theta$$

$$e^{1.15 \, X} - \delta e^{1.15 \, X} \tan \theta = 1 + \delta \tan \theta; \text{ add } \delta e^{1.15 \, X} \tan \theta \text{ both sides}$$

$$e^{1.15 \, X} = 1 + \delta \tan \theta + \delta e^{1.15 X} \tan \theta \text{ factor } = 1 + \delta \tan \theta (1 + e^{1.15 \, X})$$

$$e^{1.15 \, X} - 1 = \delta \tan \theta (1 + e^{1.15 \, X})$$

$$\frac{e^{1.15 \Delta X} - 1}{e^{1.15 \Delta X} + 1} = \delta \tan \Theta; \text{ Multiply by } \frac{e^{\frac{-1.15 \Delta X}{2}}}{e^{\frac{-1.15 \Delta X}{2}}}$$

$$\frac{e^{-0.575 \Delta X} e^{1.15 \Delta X} - e^{-0.575 \Delta X}}{e^{-0.575 \Delta X} e^{1.15 \Delta X} + e^{-0.575 \Delta X}} = \delta \tan \Theta \text{ Multiply by } \cot \Theta$$

$$\left[ \frac{e^{0.575 \Delta X} - e^{-0.575 \Delta X}}{e^{0.575 \Delta X} + e^{-0.575 \Delta X}} \right] \cot \Theta = \delta$$

-continued $$\tanh(\gamma) = \frac{\sinh(\gamma)}{\cosh(\gamma)}$$

$$\sinh(\gamma) = \frac{e^{+\gamma} - e^{-\gamma}}{2}; \cosh(\gamma) = \frac{e^{\gamma} + e^{-\gamma}}{2}$$

$$\tanh(\gamma) = \frac{e^{+\gamma} - e^{-\gamma}}{e^{+\gamma} + e^{-\gamma}}$$

$$\cot\theta \tanh(0.575\Delta X) = \delta$$

For angles $X < 0.5°$ $\tanh(X) = X$
$\tanh(0.575\Delta X) = 0.575\Delta X$ (approx.)
$\delta = 0.575 \cot(\theta)\Delta X$ radians $$\delta° = \frac{180}{\pi} 0.575 \cot(\theta)\Delta X$$

$\delta = 32.8 \cot(\theta)\Delta X$ degrees

This equation indicates that the nearer $\theta$ is to 90°, the greater will be the recorder output for a given rotation $\delta$. The maximum value of $\theta$ is limited by the spectral resolution required for a given experiment. When the amount of light at the detector from beam 21 falls below a critical level because of large specimen absorbance or large $\theta$, $I'$ is attenuated by the addition of standard attenuator 41 provided in the path of beam 19 to provide a difference in intensity of light in the two paths that is in the operating range of the recorder. Slits in monochromator widen to decrease the spectral resolution.

Figure 3:
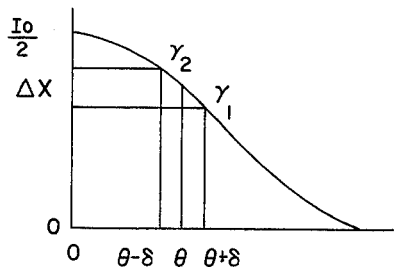
FIG. 3 is a graph of intensity versus displacement of the polarization plane to equal angles with the reference plane.

For specimens lacking the inherent capability of rotating the plane of polarization, magnetic device 39 with ceramic ring magnets to produce a 575 gauss field is provided for reversible mounting astride specimen 35 for Faraday rotation, $\delta$, by assisting in displacement of the plane of rotation by the specimen through equal angles (FIG. 3) to provide a pair of recorder values for which reflections and absorptions by the specimen are neutralized.

The difference in recorder outputs with magnets 39 reversed $$\Delta X = \gamma_1 - \gamma_2 = \log\left[\frac{I'}{I_+} \div \frac{I'}{I_-}\right]$$

$$\Delta X = \log\frac{\cos^2(\theta - \delta)}{\cos^2(\theta + \delta)} = 2\log\frac{\cos(\theta - \delta)}{\cos(\theta + \delta)}$$

changing to base $e$ $$\Delta X = \frac{2}{2.3} \ln_e\left[\frac{\cos(\theta - \delta)}{\cos(\theta + \delta)}\right] = \frac{1}{1.15}\ln_e\frac{\cos(\theta - \delta)}{\cos(\theta + \delta)}$$

$$e^{1.15\Delta X} = e^{\ln_e\left[\frac{(\cos\theta - \delta)}{(\cos\theta + \delta)}\right]} = \frac{(\cos\theta - \delta)}{(\cos\theta + \delta)}$$

$$e^{\ln X} = X$$

$$e^{1.15\Delta X} = \frac{\cos(\theta - \delta)}{\cos(\theta + \delta)} = \frac{\cos\theta\cos\delta + \sin\theta\sin\delta}{\cos\theta\cos\delta - \sin\theta\sin\delta}$$

For $\delta < 1°$, $\cos\delta = 1$ and $\sin\delta = \delta$ radians $$e^{1.15\Delta X} = \frac{\cos(\theta - \delta)}{\cos(\theta + \delta)} = \frac{\cos\theta(1) + \delta\sin\theta}{\cos\theta(1) - \delta\sin\theta}$$

-continued $$e^{1.15\Delta X} = \frac{\frac{\cos\theta}{\cos\theta} + \delta\frac{\sin\theta}{\cos\theta}}{\frac{\cos\theta}{\cos\theta} - \delta\frac{\sin\theta}{\cos\theta}}$$

$$e^{1.15\Delta X} = \frac{1 + \delta\tan\theta}{1 - \delta\tan\theta} \text{ Multiply } 1 - \delta\tan\theta$$

$e^{1.15 X}(1 - \delta\tan\theta) = 1 + \delta\tan\theta$ $e^{1.15 X} - \delta e^{1.15 X}\tan\theta = 1 + \delta\tan\theta$ Add $\delta$ $e^{1.15 X}\tan\theta$ to both sides $e^{1.15 X} = 1 + \delta\tan\theta + \delta e^{1.15 X}\tan\theta$ factor $= 1 + \delta\tan\theta(1 + e^{1.15 X})$ Subtract 1, both sides $e^{1.15 X} - 1 = \delta\tan\theta[1 + e^{1.15 X}]$ Divide $1 + e^{1.15 X}$, both sides $$\frac{e^{1.15\Delta X} - 1}{e^{1.15\Delta X} + 1} = \delta\tan\theta \text{ Multiply } \frac{e^{\frac{-1.15\Delta X}{2}}}{e^{\frac{-1.15\Delta X}{2}}}$$

$$\frac{e^{\frac{-1.15\Delta X}{2}}}{e^{\frac{-1.15\Delta X}{2}}} \cdot \frac{e^{1.15\Delta X} - 1}{e^{1.15\Delta X} + 1} = \delta\tan\theta$$

$$\frac{e^{-0.575\Delta X} e^{1.15\Delta X} - e^{-0.575\Delta X}}{e^{-0.575\Delta X} e^{1.15\Delta X} + e^{-0.575\Delta X}} = \delta\tan\theta$$

$$\frac{e^{0.575\Delta X} - e^{-0.575\Delta X}}{e^{0.575\Delta X} + e^{-0.575\Delta X}} = \delta\tan\theta \text{ Multiply by } \cot\theta, \text{ both sides}$$

$$\left[\frac{e^{0.575\Delta X} - e^{-0.575\Delta X}}{e^{0.575\Delta X} + e^{-0.575\Delta X}}\right]\cot\theta = \delta$$

$$\tanh(\gamma) = \frac{\sinh(\gamma)}{\cosh(\gamma)}$$

$$\sinh(\gamma) = \frac{e^{+\gamma} - e^{-\gamma}}{2}; \cosh(\gamma) = \frac{e^{\gamma} + e^{-\gamma}}{2}$$

$$\tanh(\gamma) = \frac{e^{+\gamma} - e^{-\gamma}}{e^{+\gamma} + e^{-\gamma}}$$

$\cot\theta\tanh(0.575\Delta X) = \delta$
the maximum of $\Delta X = 0.5$
$\tanh(0.575\Delta X) = 0.575\Delta X$ (Approximately)
$\delta = 0.575\cot(\theta)\Delta X$ radians $$\delta° = \frac{180}{\pi} 0.575\cot(\theta)\Delta X$$

$\delta = 32.8\cot\theta\Delta X$ degrees (Faraday rotation)

I claim:
1. An analyzer of polarization rotation by translucent specimens, comprising:
a spectrometer with a selective frequency monochromator and a recorder with optical means therebetween for establishing and converging parallel light beams from said monochromator; and,
a comparator including a polarizer, a supported specimen position, and an analyzer sequentially disposed in the path of one of said beams, said analyzer being adjustable to equal and opposite settings for modification of the intensity of the beam passing through a rotary power translucent specimen to compensate for specimen absorption and reflection and said recorder being disposed to provide outputs in logarithmic proportion to the ratios of light intensity of said parallel beams to determine the polarization rotation by the specimen.

2. An analyzer as in claim 1 with a pair of magnets for removable flanking relation with a non-rotary power specimen; said magnets being disposed for polarization reversal to provide recorder readings to determine magnetically assisted polarization rotations by the specimen.

3. An analyzer as in claim 1 with said comparator including an attenuator for insertion in the path of the other of said beams to modify the intensity thereof.

* * * * *